United States Patent
Yamada et al.

[11] Patent Number: 6,054,110
[45] Date of Patent: Apr. 25, 2000

[54] PROCESS FOR PRODUCING LITHIUM-COBALT COMPOSITE OXIDE

[75] Inventors: Ryoji Yamada; Kenji Hashimoto; Shinichiro Ban, all of Shirako-machi, Japan

[73] Assignee: Ise Kagaku Kogyo Kabushiki Kaisha Tokyo-to, jpx

[21] Appl. No.: 09/111,379

[22] Filed: Jul. 7, 1998

[30] Foreign Application Priority Data

Jul. 30, 1997 [JP] Japan ................................. 9-218363

[51] Int. Cl.[7] ............................ C01B 13/14; C01G 49/00; C01G 37/14; C01D 1/00; H01M 4/02
[52] U.S. Cl. ..................... 423/592; 423/594; 423/596; 423/641; 429/209
[58] Field of Search ................... 423/592, 594, 423/596, 641; 429/209

[56] References Cited

U.S. PATENT DOCUMENTS

| | | | |
|---|---|---|---|
| 4,567,031 | 1/1986 | Riley | 423/593 |
| 5,211,933 | 5/1993 | Barboux et al. | 423/596 |
| 5,478,673 | 12/1995 | Funatsu | 429/197 |
| 5,571,637 | 11/1996 | Idota | 429/218 |
| 5,629,110 | 5/1997 | Kobayashi et al. | 429/223 |
| 5,630,993 | 5/1997 | Amatucci et al. | 423/594 |
| 5,631,105 | 5/1997 | Hasegawa et al. | 429/194 |
| 5,693,435 | 12/1997 | Amatucci et al. | 429/218 |

*Primary Examiner*—Steven P. Griffin
*Assistant Examiner*—Cam N. Nguyen
*Attorney, Agent, or Firm*—Oblon, Spivak, McClelland, Maier & Neustadt, P.C.

[57] ABSTRACT

A mixture of a cobalt compound and a lithium compound is calcined at a temperature of 250° C. to 1,000° C., where said cobalt compound has a cobalt content of 68.5±6% by weight, its composition is substantially represented by a formula $H_xCoO_y$ provided that $0 \leq x \leq 1.4$ and $1.3 \leq y \leq 2.2$, the half value width of a diffraction peak showing a maximum intensity in the neighborhood of $2\theta = 36-40$ degrees in X-ray diffraction using CuKα as a radiation source is greater than 0.31 degrees, and the relation between the cobalt content and the half value width is represented by the following formula:

Half value width (degrees) $\geq 7.5 - 0.1 \times$ (Cobalt content) (% by weight). This provides an inexpensive and simple process for producing a lithium-cobalt composite oxide having uniform crystals, and a high-performance electrode active material for use in lithium secondary cells in high capacity and excellent in the charging-discharging cycle characteristics.

13 Claims, 1 Drawing Sheet

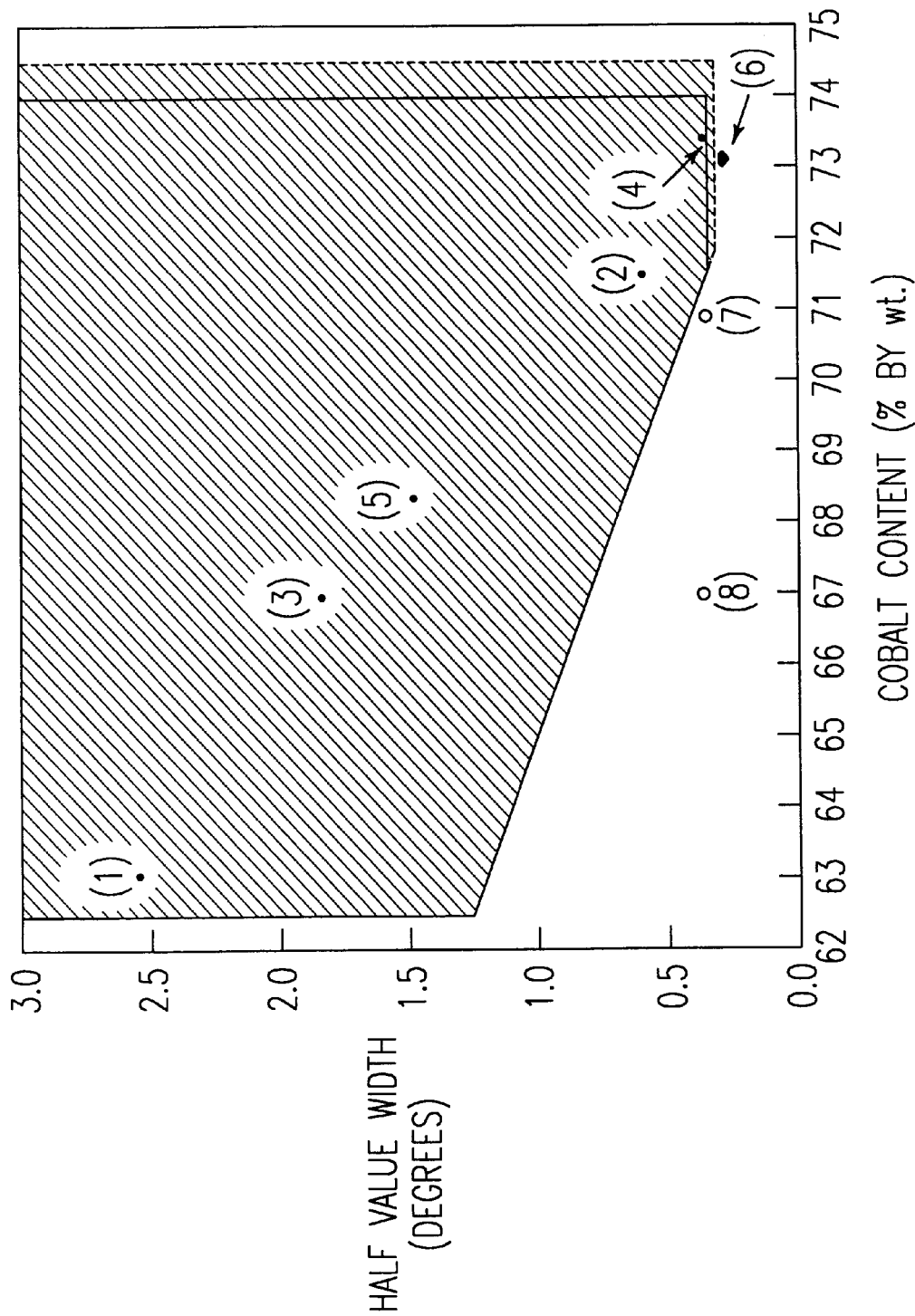

PROCESS FOR PRODUCING LITHIUM-COBALT COMPOSITE OXIDE

BACKGROUND OF THE INVENTION

1. Field of the Invention

The present invention relates to a cobalt compound and especially a cobalt compound successfully usable as a cobalt source for lithium-cobalt composite oxide, and a process for producing a lithium-cobalt composite oxide produced by using said cobalt compound as a cobalt source.

2. Description of the Related Art

Transition metal oxides having a hexagonl laminar crystal structure are known to allow ingress of metallic ion having an appropriate size into the crystal lattice sites and/or between the crystal lattices. Especially in case of lithium interlaminar compounds, lithium ion can be introduced into crystal lattice sites and/or between crystal lattices and the introduced lithium ion can be taken out again, under a specific potential difference. For this reason, lithium cells and lithium secondary cells using a lithium composite oxide as an electrode active material are industrially used and manufactured.

As electrode-active material, cobaltic salt of lithium (lithium cobaltate) is most typical and most effective. Although there have been made various attempts to replace the expensive cobalt with other inexpensive transition metals such as nickel, manganese or the like, no technique capable of completely replacing cobalt with other transition metal has yet been established.

Lithium cobaltate, however, has a fault that its discharging capacity decreases when charging and discharging are repeated. This decrease has been considered attributable to that repetition of charging and discharging, namely egress and ingress of lithium ion, is accompanied by contraction and expansion of crystal lattice (J. Electrochem. Soc., 139, 2091 (1992)) which causes destruction of the active material granules and elimination thereof.

With the aim of overcoming such a fault of lithium cobaltate and improving the charging-discharging characteristics thereof, a variety of attempts have been made so far.

Lithium composite oxides are generally prepared by a solid phase reaction, namely by heating a mixture of granular starting materials constituting the objective compound. Accordingly, the characteristic properties of the granular active material are much influenced by selection of starting constituents, properties of starting granular constituents and homogeneity of the mixture.

According to the prior process for producing a granular electrode active material consisting of interlaminar lithium compound, namely the so-called dry process, predetermined quantities of granular starting materials which are to form the active material are mixed together and homogenized with pulverization, and the mixture of precursors of active material thus obtained is heat-treated.

According to this prior process, it is impossible to mix the starting constituents on a molecular level and to disperse the materials uniformly even on the level of granules. Thus, the active materials produced according to such a prior process have been markedly uneven in formulation.

Apart from the dry process, a wet process or a process of preparing a solution of active material-constituting elements and depositing salts of the elements to prepare a uniform mixture of granular precursors has also been studied. According to the conventional wet process, the elements are deposited or precipitated in the form of oxalates, and the oxalates are washed with water, dried and calcined to obtain a granular active material. However, water-solubility of oxalate is greatly different from an element to another, so that formulation of final product becomes deviating from the starting formulation in the course of washing.

Further, as yet another process, precipitation of the elements in the form of hydroxides or carbonates has also been studied. This process, however, is similar to the oxalate process in that formulation of final product unavoidably deviates from the initial one in the course of washing and this process has an additional fault that coarse granules are formed during calcination.

Apart from the processes mentioned above, there has also been studied a process of converting a sol consisting of alkoxides of lithium and other prescribed transition metals constituting an electrode active material to a gel according to the sol-gel conversion method, and calcining the gel to obtain an active material (WO92/18425). Since this method makes it possible to obtain a lithium cobaltate in which the constituents are uniformly arranged on a molecular level, this process is expected to give an active material highly resistant to the contraction and expansion brought about by egress and ingress of lithium ion and capable of manifesting excellent charging-discharging characteristics. However, this process is difficult to adopt industrially, because of the extreme expensiveness of alkoxides.

Since the material forming the matrix releasing and accepting lithium ion is a cobalt compound, many studies have so far been conducted on the cobalt source.

For instance, a method of using a cobalt oxide prepared by heat-treatment of spherical or ellipsoidal cobalt hydroxides prepared by crystallization method has been proposed (JP-A 54888/1993). However, the active material prepared according to this technique cannot be considered especially excellent in charging-discharging characteristics.

There has also been proposed a method for preparing a lithium cobaltate of specific form which uses a $Co_3O_4$ prepared by heat-treatment of specific cobalt hydroxide as a cobalt source in order to reproduce the form of the starting cobalt hydroxide (JP-A 022693/1997). However, the cobalt hydroxide used therein is nothing other than quite usual one, so that the lithium cobaltate produced therefrom has no characteristics to be especially differentiated from usual characteristics. That is to say, this technique cannot be said to offer a method for essential solution of the problem. Additionally saying, the description that a product obtained by heat-treating a cobalt hydroxide at a temperature higher than the decomposition temperature thereof to form $Co_3O_4$ and then calcining the thus obtained $Co_3O_4$ as a cobalt source at a temperature of 900° C. reproduces the form of the starting cobalt hydroxide is quite unnatural.

Further, an attempt to produce a lithium cobaltate from a trivalent cobalt compound originally having the form of hexagonal crystal system at a low temperature by the technique of ion exchange has also been studied (Solid State Ionics, 84, 169 (1996)). This technique, however, has a fault that it requires a complicated procedure of pelletizing the above-mentioned cobalt compound together with twice its equivalent quantity of lithium compound, adding an approximately same quantity, as that of the pellet, of water to the pellet, and allowing the mixture to stand for 5 days under an elevated pressure of at least 6 atmospheres. Furthermore, this technique has a fault that a usable electrode active material is obtained only after washing away the excessive lithium compound and heat-treating the washed material at a temperature of 250° C. or above for one day.

BRIEF SUMMARY OF THE INVENTION

It is an object of the present invention to provide a cobalt compound which is a light aggregate of fine granules suppressed in the growth of crystals and excellent in reactivity in solid phase; a lithium-cobalt composite oxide having a strong and solid laminar crystal structure uniform in quality, high in the discharging capacity and excellent in the charging-discharging characteristics obtained by using said cobalt compound as a cobalt source; and a process for The present invention provides a process for producing a lithium-cobalt composite oxide characterized by calcining a mixture of a cobalt compound and a lithium compound, wherein said cobalt compound has a cobalt content of 68.5±6% by weight and is substantially represented by a composition formula $H_xCoO_y$ in which $0 \leq x \leq 1.4$ and $1.3 \leq y \leq 2.2$, the half value width of a diffraction peak of said cobalt compound showing a maximum intensity in the neighborhood of $2\theta = 36-40$ degrees in an X-ray diffraction pattern using CuKα as a radiation source is greater than 0.31 degree, and the relation between the cobalt content and the half value width is represented by the following formula:

Half value width (degrees) $\geq 7.5 - 0.1 \times$(Cobalt content) (% by weight)

and a lithium-cobalt composite oxide and an electrode active material produced according to the above-mentioned process.

BRIEF DESCRIPTION OF THE DRAWINGS

FIG. 1 is a graph illustrating the relation between cobalt content in the cobalt compound of the present invention suitable for use as a cobalt source for lithium-cobalt composite oxide and half value width of the diffraction peak appearing in the neighborhood of $2\theta = 36-40$ degrees in X-ray diffraction using CuKα as a radiation source. In FIG. 1, the hatching means that samples falling in the hatched area are suitable for use as a cobalt source for the lithium-cobalt composite oxide of the present invention.

DETAILED DESCRIPTION OF THE INVENTION

The present invention is characterized by producing a lithium-cobalt composite oxide by the use of a cobalt compound low in crystallinity or, even if having a crystallinity, quite small in crystal size as a cobalt source.

Any cobalt compounds having a low crystallinity may be used as the cobalt compound of the present invention. Preferred are cobalt compounds prepared by using one or both of amorphous and polymorphous trivalent cobalt compounds as starting material, because such cobalt compounds are easy to prepare and excellent in solid phase reactivity.

Especially preferred cobalt compounds are trivalent cobalt compounds substantially represented a composition formula $HCoO_2$, because such cobalt compounds can stably be used as the cobalt compound of the present invention either directly or after a heat-treatment.

The heat-treatment may be a drying treatment carried out at a temperature of about 100° C., if desired. It is also possible to carry out the heat-treatment in the temperature range of 120–910° C. where a change of the compound may take place. A temperature range exceeding 910° C., however, is undesirable because such a temperature is close to the decomposition temperature and the reaction is difficult to control at such a temperature.

The period of time for the heat-treatment is usually at most 100 hours, though it may be dependent on the temperature of treatment. If the treatment is continued for 100 hours, the reaction reaches a completion, roughly saying.

The present inventors have found that such cobalt compound of the present invention as have been mentioned above has unique properties unobservable on the hitherto known cobalt oxides or cobalt hydroxides.

Thus, the cobalt compound of the present invention contains cobalt in an amount of 68.5±6% by weight and is substantially represented by a composition formula $H_xCoO_y$, wherein $0 \leq x \leq 1.4$ and $1.3 \leq y \leq 2.2$. A cobalt compound of the present invention wherein y is not smaller than 1.3, x satisfies $0 \leq x \leq 1.4$ and cobalt content is in the range of 68.5±6% by weight is preferably used as starting material for the lithium-cobalt composite oxide of the present invention, because the lithium-cobalt composite oxide of the present invention can be produced therefrom without supplying oxygen or air. On the other hand, a cobalt compound of the present invention wherein y is not greater than 2.2 is also preferable, because such a cobalt compound is stable and easy to handle.

Further, the cobalt compound of the present invention is characterized in that, in the X-ray diffraction using CuKα as a radiation source, the half value width of a diffraction peak showing a maximum intensity in the neighborhood of $2\theta = 36-37.5$ degrees which can be regarded as due to a diffraction on the (311) surface of $Co_3O_4$ is greater than 0.31 degree. Further, this half value width is preferably in the following relation:

Half value width $\geq 7.5 - 0.1 \times$(Cobalt content)

with cobalt content (% by weight). If the half value width is smaller than 0.31 degree, the reactivity in solid phase is low. If the half value width is smaller than $(7.5 - 1.0 \times$(Cobalt content)), largely grown crystal grains obstruct uniform progress of the reaction.

Especially preferred cobalt compounds are those in which the above-mentioned half value width of diffraction peak is greater than 0.35 degree and cobalt content is 74% by weight or less, because such cobalt compounds make it possible to produce lithium cobalt composite oxide of more uniform quality stably without supplying oxygen or air over a wide temperature range.

The cobalt compound of the present invention may comprise one or both of CoOOH and $Co_2O_3.H_2O$. Further, the cobalt compound of the present invention may comprise $Co_3O_4$. Furthermore, the cobalt compound of the present invention may simultaneously comprise $Co_3O_4$ and one or both of CoOOH and $Co_2O_3.H_2O$.

The cobalt compound of the present invention is successfully usable as a cobalt source for lithium composite oxides. Such cobalt compound is mixed with an appropriate lithium compound and calcined to give a lithium-cobalt composite oxide of the present invention.

As said lithium compound, any compounds may be used so far as they contain lithium element. However, oxides, hydroxides and salts of lithium and mixtures of two or more of these compounds are preferred from the viewpoint of easiness to handle.

According to the present invention, a lithium-cobalt composite oxide is prepared by calcining a mixture of the above-mentioned cobalt compound and the above-mentioned lithium compound. The lithium-cobalt composite oxide thus prepared is fabricated in a granular form and utilized as a material for cells. Accordingly, it is preferable that the precursory mixture is also in a granular form. For the same reason as above, it is preferable that at least one of the cobalt compound and lithium compound has a granular form. Since the cobalt compound of the present invention is a light aggregate of fine granules, it is especially preferable as a cobalt source for the lithium-cobalt composite oxide of the present invention.

The precursory mixture which is afterwards converted to the lithium-cobalt composite oxide of the present invention can be prepared according to the procedure of prior dry process, as it is. That is, a uniformly dispersed precursory mixture can be prepared by mixing together and pulverizing necessary quantities of the granular lithium compound and the granular cobalt compound. A precursory mixture of uniform quality can be obtained by this method, which is due to the above-mentioned effect of the cobalt compound used in the invention.

It is also possible to prepared a precursory mixture by adding and mixing a solvent and/or a dispersion medium into a mixture of the granular lithium compound and the granular cobalt compound to obtain a slurry, and putting the slurry to use as it is or after dryness. As the solvent and/or dispersion medium used herein, water is preferred from the viewpoint of easiness to handle.

Usually, the cobalt compound of the present invention can be regarded as a light mixture of very fine granules having no firm crystal structure. If such a granular cobalt compound is mixed with a granular lithium compound while pulverizing the mixture, the cobalt compound is readily pulverized to give a uniformly dispersed and homogenized precursory mixture.

On the other hand, in a precursory mixture prepared via a slurry in solvent and/or a dispersion medium, the lithium compound can permeate into the gap between cobalt compound granules. Thus, it is expected that a lithium-cobalt composite oxide of uniform quality can be prepared even if the calcining treatment is carried out at a lower temperature.

Into the lithium-cobalt composite oxide of the present invention may be incorporated many other transition metals. Transition metals which are considered especially effective and successfully usable in the present invention include chromium, copper, iron, indium, manganese, nickel, vanadium, etc.

These transition metals can be compounded in the form of granules, solutions or dispersions of oxides, hydroxides, peroxides, salts, etc. and formed into a precursory mixture of the lithium-cobalt composite oxide of the present invention.

The granular precursory mixture prepared in the above-mentioned manner is then calcined to give the lithium-cobalt composite oxide of the present invention. The temperature of calcination is preferably in the range of from 250° C. to 1,000° C. At a temperature lower than 250° C., the reaction cannot be completed, and the remaining unreacted substances deteriorate the cell performance. On the other hand, if the temperature of calcination is higher than 1,000° C., disorders appear in the crystal structure to deteriorate the cell performance and safety.

The time period of calcination may be dependent on the temperature of calcination. At a calcination temperature of 500° C., the treatment is preferably continued for at least 30 minutes, whereby the reaction can be completed. If heating is continued after completion of the reaction, there is no noticeable merit. Accordingly, the time period of calcination is preferably at most 100 hours.

The calcination can be effected by heating the precursory material in a furnace. Otherwise, it is also possible to treat the precursory material while letting flow the material by means of rotary kiln or the like. It is also possible to treat the material continuously by means of a conveyer in a tunnel furnace.

According to the process of the present invention for producing a lithium-cobalt composite oxide, an interlaminar lithium compound having a strong and solid crystal structure of single phase can be produced even by a low temperature calcination, and the cost for production can be reduced. Further, the product has a uniform composition, the granular size and density of the product can be controlled easily, and the lithium-cobalt composite oxide obtained by the process of the invention functions quite effectively as an electrode active material. A lithium ion cell using such an active material as an electrode exhibits a high discharging capacity and excellent cycle characteristics.

The process of the present invention for producing a lithium-cobalt composite oxide is characterized by using, as a cobalt source thereof, a cobalt compound low in crystallinity and/or very small in crystal size even if it is crystalline, which has been prepared from an amorphous and/or polymorphous trivalent cobalt compound.

According to the process of the present invention, the solid phase reaction for forming a lithium-cobalt composite oxide can be completed over a wide calcination temperature range, which is attributable to that the compound of the present invention is a light aggregate of fine granules and such characteristic properties of the compound enhance dispersibility and mixing characteristics, and the low crystallinity and the absence of largely grown crystal grains enhance the reactivity in solid phase. Due to such effects, the process of the present invention can stably produce a lithium-cobalt composite oxide made of uniformly grown good crystals whether the calcination is carried out at a low temperature or at a high temperature.

If a region of uneven mixing is present in the starting material or if the starting material is contaminated by large-sized crystals, the solid phase reaction is disturbed in such regions, which results in undesirable phenomena such as covering of reaction product crystal surfaces with incompletely reacted material or exposure of such an incompletely reacted material. These undesirable phenomena cause a deterioration in charging-discharging cycle characteristics. The cobalt compound of the present invention is free from such undesirable phenomena, and the above-mentioned highly uniform dispersibility, good mixing characteristics and the low crystallinity promote a uniform progress of the solid phase reaction, by which a lithium-cobalt composite oxide excellent in cell characteristics can be produced.

In the process of the present invention, the characteristic properties of the lithium-cobalt composite oxide produced thereby can be controlled by changing the conditions of calcination. For instance, by changing the temperature and time period of calcination, granular size, specific surface area and density of the composite oxide can be varied in wide ranges while maintaining the strong and solid laminar crystal structure.

The active material made of strong and solid crystals of lithium-cobalt composite oxide obtainable according to the process of the present invention suppresses the occurrence of strains at the time of ingress and egress of lithium ion and thereby protects the electrode from breakage. Due to such an effect, a secondary cell using the active material of the present invention can carry a large current and can be charged rapidly with achievement of a high capacity and a long lifetime.

EXAMPLE 1

On a commercially available CoOOH (a product of Queensland Nickel Pty. Ltd.), nickel content and half value width of the diffraction peak appearing in the neighborhood of 2θ=36–37.5 degrees in an X-ray diffraction using CuKα as radiation source were measured. As a result, the cobalt content was 63.2% by weight and the half value width was 2.55 degrees. These results corresponded to a composition formula of $H_{1.15}CoO_{2.07}$, and the relation between cobalt content and half value width was as depicted in FIG. 1 (1). Thus, this material was judged as suitable for use as a cobalt source for the lithium-cobalt composite oxide of the present invention.

A granular precursor of lithium-cobalt composite oxide was prepared by mixing 93.2 g of the CoOOH mentioned above with 43.2 g of $LiOH.H_2O$ and 50 g of water, stirring the mixture at 90° C. for 2 hours until it reached dryness, taking out the dry powdery material and further drying the powder at 100° C. for 2 hours.

The granular precursor was calcined at 700° C. for 3 hours to obtain 97.5 g of $LiCoO_2$ having a mean granular size of 6.1 μm.

A paste was prepared by kneading 90 parts of the $LiCoO_2$ together with 5 parts of carbon and 5 parts of polyvinylidene fluoride in the presence of N-methylpyrrolidone. The paste was coated onto an aluminum foil, dried, rolled, and punched out into a predetermined size to obtain a positive pole plate.

On the other hand, a mixture of 95 parts of carbon, 5 parts of polyvinylidene fluoride and 20 parts of N-methylpyrrolidone was kneaded to prepare a paste. The paste was coated onto a copper foil, dried, rolled, and punched out into a predetermined size to obtain a negative pole plate.

Each of the positive and negative pole plates thus obtained was connected to respective lead wire and introduced into a stainless steel-made cell case, provided that a polyethylene-made separator was interposed between the positive and negative pole plates to separate them from each other. Subsequently, an electrolytic solution prepared by dissolving 1 mole/liter of lithium hexafluorophosphate in a liquid mixture consisting of ethylene carbonate and diethylene carbonate was poured into the cell case to prepare a model cell.

The cell characteristics were evaluated by the use of a charging-discharging measuring apparatus. Thus, the cell was charged at 25° C. at a maximum charging current of 0.20 mA until the cell voltage reached 4.2V, after which the cell was discharged at the same current as above until the cell voltage reached 2.7V. The charging and discharging cycle was repeated, and the initial discharging capacity and the discharging capacity after 100 cycles were determined. As the initial discharging capacity, the value in the third cycle was used. The results were as shown in the following table.

| Example No. | Initial discharging capacity (mAh/g) | Discharging capacity after 100 cycles (mAh/g) | Maintenance of capacity (%) |
|---|---|---|---|
| Example 1 | 162 | 152 | 93.8 |
| Example 2 | 157 | 146 | 93.0 |
| Example 3 | 159 | 151 | 95.0 |
| Example 4 | 159 | 146 | 91.8 |
| Example 5 | 161 | 150 | 93.2 |
| Comparative Example 3 | 108 | 60 | 55.6 |
| Comparative Example 4 | 141 | 97 | 68.8 |

The maintenance of capacity was calculated according to the following formula:

$$\text{Maintenance of capacity (\%)} = \frac{\text{Discharging capacity after 100 cycles}}{\text{Initial discharging capacity}} \times 100$$

EXAMPLE 2

One hundred grams of CoOOH (a product of Queensland Nickel Pty. Ltd.) having an actually measured cobalt content of 64.2% by weight was heated at 300° C. for 7 hours to prepare 89.3 g of cobalt compound (2).

The cobalt compound (2) had a cobalt content of 71.5% by weight, and its composition was represented by $H_{0.19}CoO_{1.46}$. In X-ray diffraction using CuKα as a radiation source, the half value width of a diffraction peak found in the neighborhood of 2θ=36–37.5 degrees was 0.60 degree.

The relation between the cobalt content and the half value width of X-ray diffraction peak was as shown in FIG. 1, based on which the cobalt compound (2) was judged as suitable for use as a cobalt source for the lithium-cobalt composite oxide of the present invention.

Then, 82.4 g of the compound (2) and 43.2 g of $LiOH.H_2O$ were mixed together with stirring and then calcined at 700° C. for 5 hours to give 97.9 g of $LiCoO_2$ having a mean granular size of 7.8 μm.

A model cell was prepared in the same manner as in Example 1, except that the $LiCoO_2$ obtained above was used. The cell characteristics of the model cell were as shown in Table 1.

EXAMPLE 3

The procedure of Example 2 was repeated, except that the heat-treatment was carried out at 150° C. for 15 hours. Thus, 95.5 g of cobalt compound (3) was obtained.

The cobalt compound (3) had a cobalt content of 67.0% by weight, and its composition was represented by $H_{0.68}CoO_{1.79}$. In X-ray diffraction using CuKα as a radiation source, the half value width of a diffraction peak found in the neighborhood of 2θ=36–37.5 degrees was 1.86 degrees. As is apparent from FIG. 1, the cobalt compound (3) was judged as suitable for use as a cobalt source for the lithium-cobalt composite oxide of the present invention.

Then, 88.0 g of the compound (3) and 38.1 g of $Li_2CO_3$ were mixed together with stirring and then calcined at 600° C. for 5 hours to give 97.1 g of $LiCoO_2$ having a mean granular size of 3.8 μm.

A model cell was prepared in the same manner as in Example 1, except that the $LiCoO_2$ obtained above was used. The cell characteristics of the model cell were as shown in Table 1.

EXAMPLE 4

The procedure of Example 2 was repeated, except that the heat-treatment was carried out at 500° C. for 7 hours. Thus, 87.2 g of cobalt compound (4) was obtained.

The cobalt compound (4) had a cobalt content of 73.3% by weight, and its composition was represented by $H_{0.02}CoO_{1.34}$. In X-ray diffraction using CuKα as a radiation source, the half value width of a diffraction peak found in the neighborhood of 2θ=36–37.5 degrees was 0.36 degree. As is apparent from FIG. 1, the cobalt compound (4) was judged as suitable for use as a cobalt source for the lithium-cobalt composite oxide of the present invention.

Then, 80.4 g of the compound (4) and 38.1 g of $Li_2CO_3$ were mixed together with stirring and then calcined at 700° C. for 3 hours to give 97.5 g of $LiCoO_2$ having a mean granular size of 5.8 μm.

A model cell was prepared in the same manner as in Example 1, except that the $LiCoO_2$ obtained above was used. The cell characteristics of the model cell were as shown in Table 1.

EXAMPLE 5

Ten kilograms of CoOOH having a cobalt content of 64.8% by weight was charged into a rotary kiln and heat-treated at 200° C. for one hour. Thus, 9 kilograms of cobalt compound (5) was obtained.

The cobalt compound (5) had a cobalt content of 68.4% by weight, and its composition was represented by $H_{0.51}CoO_{1.67}$. In X-ray diffraction using CuKα as a radiation source, the half value width of a diffraction peak found in the neighborhood of 2θ=36–37.5 degrees was 1.49 degrees. As is apparent from FIG. 1, the cobalt compound (5) was judged as suitable for use as a cobalt source for the lithium-cobalt composite oxide of the present invention.

Then, 8.6 kilograms of the compound (5) and 3.8 kilograms of $Li_2CO_3$ were mixed together with stirring and then calcined at 600° C. for 10 hours to give 9.7 kilograms of $LiCoO_2$ having a mean granular size of 9.3 μm.

A model cell was prepared in the same manner as in Example 1, except that the $LiCoO_2$ obtained above was used. The cell characteristics of the model cell were as shown in Table 1.

COMPARATIVE EXAMPLE 1

An aqueous solution of ammonium hydrogen carbonate (1.05 molar equivalents) was dropped into a constantly stirred aqueous solution of cobalt sulfate. The resulting precipitate was collected by filtration, washed with water and dried at 140° C. to obtain $CoCO_3$ having a water content of 1.3% by weight.

The $CoCO_3$ obtained above (100 g) was heat-treated at 850° C. for one hour to obtain 66.3 g of cobalt compound (6).

The cobalt compound (6) had a cobalt content of 73.5% by weight. In X-ray diffraction using CuKα as a radiation source, the half value width of a peak found in the neighborhood of 2θ=36–37.5 degrees was 0.30 degree.

As is apparent from FIG. 1, the cobalt compound (6) was judged as unsuitable for use as a cobalt source for the lithium-cobalt composite oxide.

A synthesis of $LiCoO_2$ was attempted by mixing 65 g of the cobalt compound (6) with 30.8 g of $Li_2CO_3$ with stirring, and then calcining the mixture at 700° C. for 3 hours. However, X-ray diffraction pattern of the calcined product showed a characteristic reflection of $Co_3O_4$, demonstrating that the reaction was not yet completed.

COMPARATIVE EXAMPLE 2

An aqueous solution of sodium hydroxide (2.1 molar equivalents) was dropped into a constantly stirred aqueous solution of cobalt sulfate, and the resulting precipitate was collected by filtration, washed with water and dried at 60° C. to obtain $Co(OH)_2$ having a water content of 2.5% by weight.

The $Co(OH)_2$ obtained above (100 g) was heat-treated at 150° C. for 15 hours to obtain 87.1 g of cobalt compound (7).

The cobalt compound (7) had a cobalt content of 70.9% by weight, and its composition was expressed by a formula $H_{0.46}CoO_{1.49}$. In X-ray diffraction using CuKα as a radiation source, the half value width of a peak found in the neighborhood of 2θ=36–37.5 degrees was 0.37 degree.

As is apparent from FIG. 1, the cobalt compound (7) was judged as unsuitable for use as a cobalt source for the lithium-cobalt composite oxide.

A synthesis of $LiCoO_2$ was attempted by mixing 83.1 g of the cobalt compound (7) with 38.1 g of $Li_2CO_3$ with stirring, and then calcining the mixture at 600° C. for 5 hours. However, X-ray diffraction pattern of the calcined product showed a characteristic reflection of $Co_3O_4$, demonstrating that the reaction was not yet completed.

COMPARATIVE EXAMPLE 3

A mixture of compound (7) prepared in the same manner as in Comparative Example 2 and $Li_2CO_3$ was calcined at 700° C. for 10 hours to obtain 97.3 g of $LiCoO_2$ having a mean granular size of 5.3 μm.

A model cell was prepared by repeating the procedure of Example 1, except that the $LiCoO_2$ obtained above was used. The cell characteristics of the model cell were as shown in Table 1.

COMPARATIVE EXAMPLE 4

One hundred grams of the same $Co(OH)_2$ as used in Comparative Example 2 was heat-treated at 120° C. for 1.5 hours to obtain 92.0 g of cobalt compound (8).

The cobalt compound (8) had a cobalt content of 67.0% by weight, and its composition was expressed by a formula $H_{1.2}CoO_{1.73}$. In X-ray diffraction using CuKα as a radiation source, the half value width of a peak found in the neighborhood of 2θ=36–37.5 degrees was 0.38 degree.

As is apparent from FIG. 1, the cobalt compound (8) was judged as unsuitable for use as a cobalt source for the lithium-cobalt composite oxide.

A mixture of 88.0 g of the cobalt compound (8), 43.2 g of $LiOH.H_2O$ and 50 g of water was stirred at 90° C. for 2 hours until the mixture reached dryness. The dry powdery material was taken out and further dried at 100° C. for 2 hours to obtain a precursory granular material of lithium-cobalt composite oxide.

By calcining the precursory granular material at 900° C. for 10 hours, there could be obtained 95.2 g of $LiCoO_2$ having a mean granular size of 13.3 μm.

A model cell was prepared by repeating the procedure of Example 1, except that the $LiCoO_2$ obtained above was used. The cell characteristics of the model cell were as shown in Table 1.

Effect of the Invention

According to the process of the present invention, a lithium-cobalt composite oxide having a strongly and solidly grown laminar crystal structure can be stably produced over a wide temperature region ranging from low temperatures to high temperatures. From the composite oxide of the present invention having such a grown laminar crystal structure, an electrode active material having a high discharging capacity can be prepared.

Since the lithium-cobalt composite oxide obtained according to the process of the present invention has a uniformly grown crystal structure, no concentration of strains occurs at the time of ingress and egress of lithium ion, which is effective for prevention of electrode from breakage. Due to such an effect, an electrode active material excellent in charging-discharging cycle characteristics, capable of carrying a great current and capable of being charged rapidly can be formed, and a secondary cell of long lifetime and high performance can be produced.

What is claimed is:

1. A process for producing a lithium-cobalt composite oxide comprising forming a dry mixture of a cobalt compound and a lithium compound different than the cobalt compound; and calcining the dry mixture at a temperature of 250 to 1,000° C., wherein said cobalt compound has a cobalt content of 68.5±6% by weight and is substantially represented by a composition formula $H_xCoO_y$ in which $0 \leq x \leq 1.4$ and $1.3 \leq y \leq 2.2$, a half value width of a diffraction peak of said cobalt compound having a maximum intensity in the region of 2θ=36–40 degrees in an X-ray diffraction pattern using CuKα as a radiation source is greater than 0.31 degrees, and a relation between the cobalt content and the half value width is represented by the following formula:

half value width (degrees)≧7.5−0.1×(Cobalt content) (% by weight).

2. The process for producing a lithium-cobalt composite oxide claimed in claim 1, wherein said cobalt compound is one or both of an amorphous trivalent cobalt compound and a polymorphous trivalent cobalt compound.

3. The process for producing a lithium-cobalt composite oxide claimed in claim 2, wherein said trivalent cobalt compound is substantially represented by a composition formula $HCoO_2$.

4. The process for producing a lithium-cobalt composite claimed in claim 1, wherein said cobalt compound is prepared by heat-treatment of one or both of an amorphous trivalent cobalt compound and a polymorphous trivalent cobalt compound.

5. The process for producing a lithium-cobalt composite oxide claimed in claim 4, wherein said trivalent cobalt compound is substantially represented by a composition formula $HCoO_2$.

6. The process for producing a lithium-cobalt composite oxide claimed in claim 4, wherein said heat treatment is carried out in a temperature range not exceeding 910° C.

7. The process for producing a lithium-cobalt composite oxide claimed in claim 1, wherein said cobalt compound comprises one or both of CoOOH and $Co_2O_3.H_2O$.

8. The process for producing a lithium-cobalt composite oxide claimed in claim 1, wherein said cobalt compound comprises $Co_3O_4$.

9. The process for producing a lithium-cobalt composite oxide claimed in claim 1, wherein said cobalt compound comprises $Co_3O_4$ and one or both of CoOOH and $Co_2O_3.H_2O$.

10. The process for producing a lithium-cobalt composite oxide claimed in claim 1, wherein said lithium compound is at least one member selected from the group consisting of oxides, hydroxides and salts of lithium.

11. The process for producing a lithium-cobalt composite claimed in claim 1, wherein the dry mixture is formed by mixing the cobalt compound, the lithium compound and water until reaching dryness.

12. A process for producing a lithium-cobalt composite oxide comprising calcining a mixture of an amorphous cobalt compound and a lithium compound at a temperature of 250 to 1,000° C., wherein said cobalt compound has a cobalt content of 68.5±6% by weight and is substantially represented by a composition formula $H_xCoO_y$ in which $0 \leq x \leq 1.4$ and $1.3 \leq y \leq 2.2$.

13. The process for producing a lithium-cobalt composite oxide claimed in claim 12, wherein said lithium compound is at least one member selected from the group consisting of oxides, hydroxides and salts of lithium.

* * * * *

UNITED STATES PATENT AND TRADEMARK OFFICE
CERTIFICATE OF CORRECTION

PATENT NO. : 6,054,110
DATED : April 25, 2000
INVENTOR(S) : Ryoji YAMADA, et al.

It is certified that error appears in the above-identified patent and that said Letters Patent is hereby corrected as shown below:

On the Title page, Item [ 75 ], the Inventors' information; and, Item [ 73 ], the Assignee information, is incorrectly listed.

Item [75] should read as follows:

--- [75]  Inventors: Ryoji Yamada; Kenji Hashimoto; Shinichiro Ban, all of Chosei-gun, Japan ---

--AND --

Item [73] should read as follows:

--- [73]  Assignee: Ise Kagaku Kogyo Kabushiki Kaisha; Tokyo-to, Japan ---

Signed and Sealed this

Twenty-second Day of May, 2001

*Attest:*

NICHOLAS P. GODICI

*Attesting Officer*    Acting Director of the United States Patent and Trademark Office